(12) United States Patent
Little et al.

(10) Patent No.: US 7,561,332 B2
(45) Date of Patent: Jul. 14, 2009

(54) APPLICATIONS AND FABRICATION TECHNIQUES FOR LARGE SCALE WIRE GRID POLARIZERS

(75) Inventors: Michael J. Little, El Dorado Hills, CA (US); Charles W. McLaughlin, San Anselmo, CA (US)

(73) Assignee: Agoura Technologies, Inc., El Dorado Hills, CA (US)

( * ) Notice: Subject to any disclaimer, the term of this patent is extended or adjusted under 35 U.S.C. 154(b) by 306 days.

(21) Appl. No.: 11/289,660

(22) Filed: Nov. 28, 2005

(65) Prior Publication Data

US 2006/0118514 A1    Jun. 8, 2006

Related U.S. Application Data

(60) Provisional application No. 60/677,309, filed on May 4, 2005, provisional application No. 60/677,310, filed on May 4, 2005.

(51) Int. Cl.
*G02B 5/30* (2006.01)
(52) U.S. Cl. .................................. 359/486; 349/1
(58) Field of Classification Search .................. None
See application file for complete search history.

(56) References Cited

U.S. PATENT DOCUMENTS

| | | | | |
|---|---|---|---|---|
| 3,046,839 A | 7/1962 | Bird et al. | ................. | 427/163.1 |
| 4,049,944 A | 9/1977 | Garvin et al. | ............. | 219/121.2 |
| 4,456,515 A | 6/1984 | Krueger et al. | ......... | 204/192.27 |
| 5,422,756 A | 6/1995 | Weber | ......................... | 359/487 |
| 5,539,554 A | 7/1996 | Lebby et al. | ................... | 349/58 |
| 5,559,634 A | 9/1996 | Weber | ......................... | 359/638 |
| 5,587,816 A | 12/1996 | Gunjima et al. | ............... | 349/62 |
| 5,703,664 A | 12/1997 | Jachimowicz et al. | ......... | 349/58 |
| 5,751,388 A | 5/1998 | Larsen | ......................... | 349/96 |

(Continued)

FOREIGN PATENT DOCUMENTS

DE    10101025    8/2002

(Continued)

OTHER PUBLICATIONS

International Search Report and Written Opinion of the International Searching Authority for International application No. PCT/US05/43031.

(Continued)

*Primary Examiner*—Allan Olsen
(74) *Attorney, Agent, or Firm*—Joshua D. Isenberg; JDI Patent

(57) ABSTRACT

A wire grid polarizer may be fabricated by forming plurality of substantially-straight metallic lines of predetermined periodicity Λ on a thin film substrate A plurality of substantially straight nanometer-scale periodic surface relief structures is created on a surface of the substrate. The periodic surface relief structures cover a region greater than about 4 centimeters in length and greater than about 4 centimeters in width, wherein the periodicity Λ is between about 10 nanometers and about 500 nanometers. One or more layers of material are formed on the periodic relief structures. The one or more layers include one or more conductor materials that form the plurality of substantially straight metallic lines over a region of the substrate greater than about 4 centimeters in length and greater than about 4 centimeters in width.

16 Claims, 12 Drawing Sheets

U.S. PATENT DOCUMENTS

| | | | |
|---|---|---|---|
| 5,808,794 A | 9/1998 | Weber et al. | 359/487 |
| 5,825,542 A | 10/1998 | Cobb, Jr. et al. | 359/487 |
| 5,828,488 A | 10/1998 | Ouderkirk et al. | 359/487 |
| 5,973,833 A | 10/1999 | Booth et al. | 359/487 |
| 5,986,730 A | 11/1999 | Hansen et al. | 349/96 |
| 6,025,897 A | 2/2000 | Weber et al. | 349/96 |
| 6,081,376 A | 6/2000 | Hansen et al. | 359/485 |
| 6,088,159 A | 7/2000 | Weber et al. | 359/487 |
| 6,096,375 A | 8/2000 | Ouderkirk et al. | 427/163.1 |
| 6,101,032 A | 8/2000 | Wortman et al. | 359/500 |
| 6,108,131 A | 8/2000 | Hansen et al. | 359/486 |
| 6,122,103 A | 9/2000 | Perkins et al. | 359/486 |
| 6,208,463 B1 | 3/2001 | Hansen et al. | 359/486 |
| 6,234,634 B1 | 5/2001 | Hansen et al. | 353/20 |
| 6,243,199 B1 | 6/2001 | Hansen et al. | 359/486 |
| 6,274,007 B1 | 8/2001 | Smirnov et al. | 204/192.13 |
| 6,288,840 B1 | 9/2001 | Perkins et al. | 359/486 |
| 6,348,995 B1 | 2/2002 | Hansen et al. | 359/486 |
| 6,356,389 B1 | 3/2002 | Nilsen et al. | 359/625 |
| 6,375,870 B1 | 4/2002 | Visovsky et al. | 264/1.31 |
| 6,447,120 B1 | 9/2002 | Hansen et al. | 353/20 |
| 6,449,092 B1 | 9/2002 | Weber et al. | 359/487 |
| 6,452,724 B1 | 9/2002 | Hansen et al. | 359/486 |
| 6,532,111 B2 | 3/2003 | Kurtz et al. | 359/486 |
| 6,543,153 B1 | 4/2003 | Weber et al. | 34/96 |
| 6,665,119 B1 | 12/2003 | Kurtz et al. | 359/486 |
| 6,788,461 B2 | 9/2004 | Kurtz et al. | 359/486 |
| 6,934,082 B2 | 8/2005 | Allen et al. | 359/487 |
| 7,079,218 B2 | 7/2006 | Park et al. | 349/191 |
| 7,106,507 B2 | 9/2006 | Lee et al. | 359/486 |
| 7,355,662 B2 | 4/2008 | Tsujimura et al. | 349/96 |
| 7,356,229 B2 | 4/2008 | Ouderkirk et al. | 385/115 |
| 2001/0028925 A1 | 10/2001 | Moshrefzadeh et al. | 427/552 |
| 2002/0044351 A1 | 4/2002 | Nilsen | 359/483 |
| 2002/0170497 A1 | 11/2002 | Smirnov et al. | 118/723 |
| 2004/0008310 A1 | 1/2004 | Leidig et al. | 349/124 |
| 2004/0027676 A1 | 2/2004 | Nilsen et al. | 359/619 |
| 2004/0037445 A1 | 2/2004 | Kirihara et al. | 381/389 |
| 2004/0169791 A1 | 9/2004 | Nilsen et al. | 349/96 |
| 2004/0183975 A1 | 9/2004 | Yamaguchi et al. | 349/137 |
| 2005/0046943 A1 | 3/2005 | Suganuma | 359/497 |
| 2006/0056024 A1 | 3/2006 | Ahn et al. | 359/486 |
| 2006/0072194 A1 | 4/2006 | Lee | 359/486 |
| 2006/0082700 A1 | 4/2006 | Gehlsen et al. | 349/64 |
| 2006/0098140 A1 | 5/2006 | Lee | 349/98 |
| 2006/0113279 A1 | 6/2006 | Little | 216/41 |
| 2006/0159958 A1 | 7/2006 | Lee | 428/690 |
| 2006/0215263 A1 | 9/2006 | Mi et al. | 359/486 |
| 2006/0262397 A1 | 11/2006 | Lee et al. | 359/486 |
| 2007/0087549 A1 | 4/2007 | Yamaki et al. | 438/613 |
| 2007/0242187 A1 | 10/2007 | Yamaki et al. | 349/96 |
| 2008/0074649 A1 | 3/2008 | Levenson et al. | 356/73 |
| 2008/0094547 A1 | 4/2008 | Sugita et al. | 349/96 |
| 2008/0165696 A1 | 7/2008 | Koo | 370/252 |

FOREIGN PATENT DOCUMENTS

| | | |
|---|---|---|
| JP | 2005 195824 | 7/2005 |
| JP | 2006 047813 | 2/2006 |
| JP | 2006 118028 | 5/2006 |
| JP | 2006 201540 | 8/2006 |
| JP | 2006 224659 | 8/2006 |
| KR | 10-0656999 | 6/2006 |
| WO | WO01/23916 | 4/2001 |
| WO | WO01/29549 | 4/2001 |
| WO | WO01/49476 | 7/2001 |

OTHER PUBLICATIONS

H. A. Biebuyck et al., "Lithography beyond light: Microcontact printing with monolayer resists", *IBM Journal of Research and Development*, vol. 41 No. 112, Jan./Mar. 1997, pp. 159-170.

By B. Michel et al. "Printing meets lithography: Soft approaches to high-resolution patterning", *IBM Journal of Research and Development*, vol. 45 No. 5, Sep. 2001.

N. Bowden et al., "The Controlled Formation of Ordered, Sunisoidal Structures by Plasma Oxidation of an Elastomeric Polymer", *Applied Physics Letters*, vol. 75, No. 17 (Oct. 25, 1999), pp. 2557-2559.

N. Bowden et al., "Spontaneous Formation of Ordered Structures in Thin Films of Metals Supported on an Elastomeric Polymer", *Nature*, vol. 393 (May 14, 1998, pp. 146-149.

W.T.S. Huck et al., "Ordering of Spontaneously Formed Buckles on Planar Surfaces", *Langmuir 2000*, vol. 16, No. 7 (2000), pp. 3497-3501.

F. Katzenberg, "Cost-Effective Production of Highly Regular Nanostructured Metallization Layers", *Nanotechnology*, vol. 14 (2003), pp. 1019-1022.

F. Katzenberg, "Irradiation- and Strain-Induced Self-Organization of Elastomer Surfaces", *Macromolecular Materials and Engineering*, vol. 286, No. 1 (2001) pp. 26-29.

U.S. Appl. No. 11/001,449, filed Nov. 30, 2004 and entitled "Non-Photolithographic Method for Forming a Wire Grid Polarizer for Optical and Infrared Wavelengths".

Masahide Kimura, "Realizing wire grid polarizer films with 120nm pitches controlled microstructure on large area For LCD panels With Nano imprint technology" Nikkei Microdevices, Dec. 2005 p. 156-157, Nikkei Business Publications, Inc. Tokyo, Japan.

Masahide Kimura, "Realizing wire grid polarizer films with 120nm pitches controlled microstructure on large area For LCD panels With Nano imprint technology" Nikkei Microdevices, Dec. 2005 p. 156-157, Nikkei Business Publications, Inc. Tokyo, Japan (English Translation).

Masahide Kimura, *Tech-On*, "Asahi Kasei wire grid polarizer film with 120nm pitch with nano technology", Yokohama, Japan Oct. 21, 2005.

Masahide Kimura, *Tech-On* "Asahi Kasei wire grid polarizer film with 120nm pitch with nano technology" Asahi Kasei Corporation, Yokohama, Japan Oct. 21, 2005 (English Translation).

Sang Hoon Kim et al, "Fabrication of a nano-wire grid polarizer for brightness enhancement in liquid crystal display" Aug. 14, 2006, p. 4436-4438, Nanotechnology 17, Institute of Physics Publishing.

"Definition of elastic Merriam-Webster Online Dictionary"—downloaded from the internet <http://209.161.33.50/dictionary/elastic>, downloaded on Mar. 16, 2007.

"Definition of elastomer—Merriam—Webster Online Dictionary", downloaded from the internet <http://209.161.33.50/dictionary/elastomer>, downloaded on Mar. 16, 2007.

International Search Report and Written Opinion of the International Searching Authority dated Jun. 11, 2008—International application No. PCT/US07/86174.

International Search Report and Written Opinion of the International Searching Authority dated Mar. 20, 2008—International application No. PCT/US07/79458.

International Search Report and Written Opinion of the International Searching Authority dated Aug. 15, 2008—International Patent Application No. PCT/US08/62306.

Glenn Elert, "Wavelength Range of Visible Light"—Hypertextbook: http://hypertextbook.com/facts/2002/PavelBorodulin.shtml, downloaded on Sep. 8, 2008, 2 pages.

Office Action for U.S. Appl. No. 11/566,103 dated May 11, 2009.

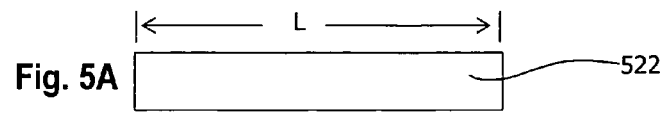
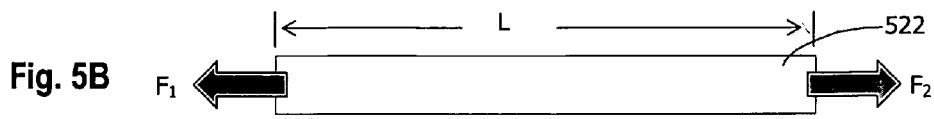
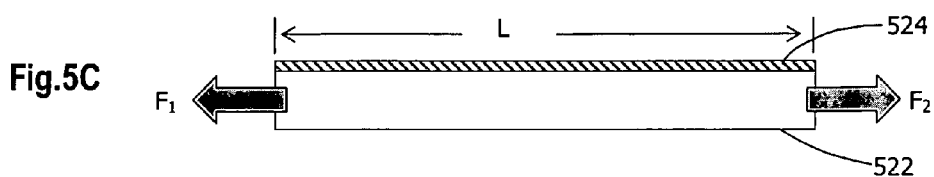
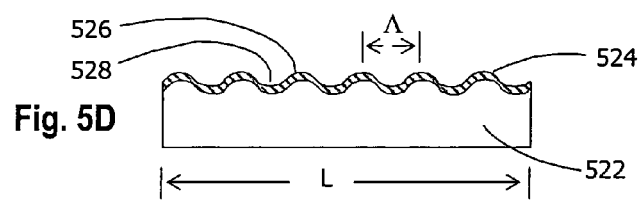
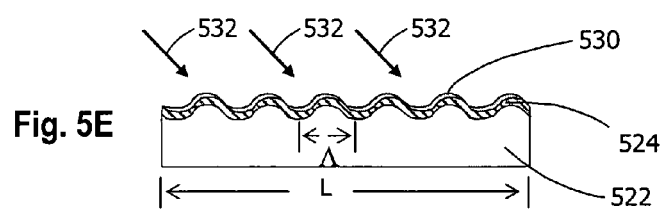
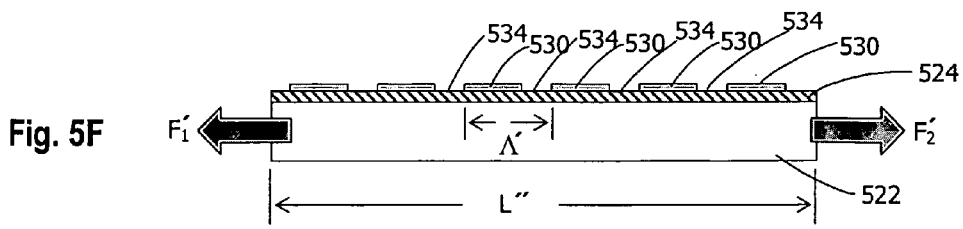

APPLICATIONS AND FABRICATION TECHNIQUES FOR LARGE SCALE WIRE GRID POLARIZERS

CROSS-REFERENCE TO RELATED APPLICATION

This application claims the benefit of priority of commonly-assigned, co-pending U.S. patent application Ser. No. 11/001,449 filed Nov. 30, 2004 and entitled "NON-PHOTOLITHOGRAPHIC METHOD FOR FORMING A WIRE GRID POLARIZER FOR OPTICAL AND INFRARED WAVELENGTHS", the entire disclosures of which are incorporated herein by reference. This application also claims the benefit of priority of commonly assigned U.S. provisional patent application number 60/677,309, filed May 4, 2005 and entitled "AN IMPROVED DIRECT-VIEW LIQUID CRYSTAL DISPLAY ASSEMBLY", the entire disclosures of which are incorporated herein by reference. This application also claims the benefit of priority of commonly assigned U.S. provisional patent application number 60/677,310, filed May 4, 2005 and entitled "DIRECT-VIEW LIQUID CRYSTAL DISPLAY ASSEMBLY WITH OPTIMIZED POLARIZERS", the entire disclosures of which are incorporated herein by reference.

FIELD OF THE INVENTION

Embodiments of this invention are related to wire grid polarizers. More particularly embodiments of this invention are related to display assemblies that use wire grid polarizers and non-photolithographic techniques for manufacturing large area wire grid polarizers that may be used in such displays.

BACKGROUND OF THE INVENTION

It can be appreciated that direct-view Liquid Crystal Displays (LCDs) have been in use for years. These direct-view LCDs are widely used in laptop computers, desktop monitors, TVs, cellular phones, and other applications. Nearly all of the direct-view LCDs are of the nematic type (TN, VA, and IPS) and therefore require polarizers to observe the optical effects produced by the application of electric fields to the liquid crystal material. An example of a direct-view LCD is schematically shown in FIG. 1. Typically these direct-view LCD assemblies contain a backlight 100 that emits unpolarized light 102, a first polarizer 110, that transmits one plane of polarization 112, a planar array of individually modulatable liquid crystal elements 118, and a second polarizer 120. The function of the first polarizer is to transmit only one plane of polarization to illuminate the planar Liquid Crystal array 118. In all current designs, the polarizers 118 and 120 are both of the dichroic type (absorption-type) wherein one plane of polarization is transmitted while the orthogonal plane of polarization is absorbed.

One significant problem with this use of tandem absorption-type polarizers is very low net transmission of the backlight illumination. With absorption-type polarizers, theoretically at best, only 50% of the output of the backlight could be available to illuminate the LCD and viewed by the viewer 130. In practice, the efficiency of the absorption-type polarizers is less than perfect and only 40-45% of the available backlight could be transmitted through any one polarizer. Thus, the net transmission of the backlight illumination by the tandem pair of polarizers 118 and 120 is at best only 36-40%.

To make a higher fraction of the output of the backlight available to the liquid crystal layer and the viewer, several polarization recovery techniques have been developed over the years. These techniques convert some of the plane of polarization that would normally be absorbed and hence unavailable, into the plane of polarization that is used to illuminate the LCD. One representative example of a polarization recovery technique is shown in FIG. 2. The example shown in FIG. 2 is from U.S. Pat. No. 5,422,756. Other examples of polarization recovery can be found in U.S. Pat. Nos. 5,587,816, 5,751,388, and 5,973,833. The principle employed in the prior art of polarization recovery can be understood from FIG. 2. As before in FIG. 1, unpolarized light 102 is provided by backlight 100. If backlight 100 does not include diffuse reflecting properties, an additional diffuser layer 240 needs to be included. The diffusing properties are exploited to randomize the plane of polarization of the light 242; converting some of the p-polarized light into s-polarization and some of the s-polarized light into p-polarization. A reflecting polarizer 250 is fundamentally different than the traditional dichroic polarizers; it transmits one plane of polarization 252 and reflects the orthogonal plane of polarization 254. Polarization recovery is accomplished by reflecting the undesired reflected plane of polarization 252 and converting a fraction of it into the desired plane of polarization whereupon it is transmitted by the reflective polarizer 250.

FIG. 2 also illustrates a problem with such reflecting polarizers. The extinction ratio of reflective polarizer 250 is so poor that a second "clean-up" polarizer 110 is required for the display to produce adequate contrast; it doesn't eliminate the need for a backside absorption-type polarizer. Thus in all current direct-view LCD designs, even those employing the currently available polarization recovery methods, two absorption-type polarizers are used in tandem.

Prior art polarization recovery techniques using a reflecting polarizer are illustrated in FIGS. 3A-3B. Examples of the design of such prior art reflective polarizers may be found, e.g., in U.S. Pat. No. 5,422,756. The reflective polarizer 300 of FIG. 3A includes transparent substrates 312 and 314 fabricated with prismatic surfaces 316. Prior to joining the prismatic surfaces of 312 and 314, a multilayer dielectric coating is deposited on one or both prismatic surfaces. After the multilayer deposition the prismatic surfaces are bonded together without any voids that would impair their optical properties. This is a complex and expensive manufacturing process. As shown in close-up in FIG. 3B, the prismatic surface 316 may be made up of hundreds of layers of alternating polymer films arranged in a stack in which amorphous films 320 alternate with birefringent films 322. The stack of films transmits a p polarization 318-$p$ while reflecting an s polarization 318-$s$ of incident light. In addition to the problem described above there are additional problems with these reflective polarizers that are related to both performance and cost. Specifically retroreflective polarizers of the type illustrated in FIG. 3A and FIG. 3B use a complex multilayer structure that is expensive to manufacture. Thus, while prior art reflective polarizers do address the need for improved brightness in LCDs, the above problems and other known problems remain.

An alternative to using two absorption-type polarizers would be to use wire grid polarizers. A wire grid polarizer typically comprises an array of closely-spaced parallel conductive lines supported by a transmitting substrate. A perspective schematic view of such a polarizer is illustrated in FIG. 4. As can be seen, the polarizer 410 comprises an array of parallel conductive lines 412 on a transparent substrate 414. Each of the conductive lines is characterized by a thickness t, a width w and a periodic separation (or period) Λ with respect to the adjacent line(s). In operation, unpolarized light 416 is incident at an angle φ. (Note: the angle of incidence φ may be zero; that is the light 416 may be normal to the surface of the polarizer 410). A portion 418 of the incident light 416 is reflected while another portion 420 is transmitted. The reflected portion 418 is almost entirely s-polarized (electric vector parallel to the direction of the conductive lines 412) while the transmitted portion 420 is almost entirely p-polarized (electric vector perpendicular to the direction of the conductive lines 412).

Ideally, a wire grid polarizer functions as a perfect mirror for one plane of polarization (e.g. s-polarized light) and is perfectly transparent to the orthogonal plane of polarization (e.g. p-polarized light). In practice, even the most reflective metals absorb some fraction and reflect only 80 to 95 percent of incident light. Similarly, due to surface reflections, a nominally transparent substrate does not transmit 100 percent of incident light. Polarizer performance over the range of wavelengths and incidence angles of interest is characterized by the contrast ratios of the transmitted ($T_p/T_s$) and reflected ($R_s/R_p$) beams and optical efficiency (percentage of incident unpolarized light transmitted).

The overall behavior of a wire grid polarizer is determined by the relationship between (1) the center-to-center spacing, or periodicity, of the parallel conductive lines and (2) the wavelength of incident radiation. Only when the periodicity, Λ, of the lines is smaller than the wavelength of interest can the array behave like a polarizer. If the periodicity of the lines should exceed the wavelength of interest, the grid will function as a diffraction grating. Further, there exists a transition region, in which periodicity of the conductive lines falls in the range of roughly one-third to twice the wavelength of interest (i.e., $\lambda/3<\Lambda<2\lambda$). Large, abrupt changes are observed to occur in such transition region, namely increases in reflectivity coupled with corresponding decreases in reflectivity for p-polarized light. Such "Raleigh resonances" occur at one or more specific wavelengths for any given angle of incidence. As a result, wire grids having periodicities that fall within such transition region are unsuitable for use as wide band polarizers.

Wire grid polarizer technology offers some inherent advantages over dichroic absorptive polarizers. Wire grid polarizers operate by the reflection and transmission of light, and are therefore neither temperature sensitive nor does it absorb excessive amounts of energy. A dichroic absorptive polarizer, by contrast, operates by the selective absorption and transmission of light. As such, a dichroic based polarizer exhibits temperature sensitivity due to (a) sensitivity of the organic dye to degradation in the presence of heating and (b) thermal rearrangement (relaxation) of the polymer alignment achieved by stretching the polymer to line up the dye molecules. Such temperature sensitivity limits the types of manufacturing process that may be employed to create dichroic adsorptive polarizers. The relatively low temperature processes available are often sub-optimal in terms of yield, quality and cost.

Wire grid polarizers were developed for use in the millimeter-wave and microwave frequency ranges. They were initially unavailable for use in the infrared and visible wavelength ranges due to the inability of then-existing processing technologies (e.g. stretching thin wires over a mandrel) to produce parallel conducting lines of sufficiently small periodicity. The application of photolithography overcame the problem of attaining the requisite small periodicities. See, for example, U.S. Pat. No. 4,049,944 of Garvin et al. Covering "Process for Fabricating Small Geometry Semiconductive Devices Including Integrated Components" which teaches, in part, a method for fabrication of wire grid polarizers employing holographic exposure of photolithographic materials. Other applications of photolithography in methods for forming wire grid polarizers are taught, for example, in the following U.S. patents: U.S. Pat. No. 6,122,103 of Perkins et al. covering "Broadband Wire Grid Polarizer For the Visible Spectrum" and U.S. Pat. No. 6,665,119 of Kurtz et al. covering "Wire Grid Polarizer".

U.S. Pat. No. 3,046,839 of Bird et al. covering "Process For Preparing Light Polarizing Materials" and U.S. Pat. No. 4,456,515 of Krueger et al. covering "Method For Making Polarizers Comprising a Multiplicity of Parallel Electrically Conductive Strips on a Glass Carrier" disclose photolithographic processes for forming wire grid polarizers that eliminate difficult etching steps. A thin layer of metal is deposited at an oblique angle to the substrate after a photolithographic pattern of finely spaced parallel lines is fabricated directly on a transparent substrate. The oblique angle of incidence, coupled with periodic topographic steps in the resist pattern, cause the metal to accumulate primarily on the sidewalls of the pattern. When photoresist is subsequently washed away, only the thin metal lines that are attached to the substrate between ridges of photoresist and accumulated on the sidewalls of the resist pattern remain.

Photolithographic techniques for reducing the periodicity of parallel conductive lines from approximately one micrometer (limiting the resultant devices to the near IR spectrum) to approximately 0.1 micrometer (suitable for the visible spectrum) has been disclosed, for example, by Karthe (see Wolfgang Karthe, "Nanofabrication Technologies and Device Integration", *Proceedings of SPIE*, vol. 2213 (July 1994), pp. 288-296).

Techniques for fabricating wire grid polarizers by methods employing photolithography face inherent and well-recognized limitations. First, the lengths of the sides of the area that can be exposed during a single exposure (and, hence, the size of the polarizer) are limited to a few inches. This is far too small for most direct view displays such as those employed in laptop computers, television sets, cell phones, personal digital assistants (PDAs) and the like. Secondly, the cost of photolithographic processes is rather high due to the costs of high-resolution photolithography mask aligners, and the requisite ultra-high quality clean room facility required to house such a system.

Holographic photolithography has been used to form light and dark regions to expose photoresist. A very sophisticated optical setup and lasers are needed to do this, but one can expose photoresist with the interference patterns. However, the interference pattern that comes from interfering two oblique beams produces a periodicity that is not any smaller than the wavelength of the laser. Thus with visible lasers it's not possible to get to the 100-nm or smaller periodicity needed for visible polarizers. One would need an extreme ultra-violet wavelength laser and photoresists suitable for use in this spectral region are not commonly available.

Thus, there is a need in the art, for a wire grid polarizer large enough to be used for direct view displays and a method for fabricating such a wire grid polarizer.

SUMMARY OF THE INVENTION

The disadvantages associated with the prior art are overcome by embodiments of the present invention.

According to a first embodiment of the invention, wire grid polarizers may be fabricated using a method for forming a plurality of substantially-straight metallic lines of predetermined periodicity Λ on a thin film substrate One or more layers of material, including a sacrificial layer and one or more conductor materials, are formed on a surface of the substrate. Nanometer-scale periodic surface relief structures are created on a surface of the substrate and/or sacrificial layer. The one or more materials are then selectively etched to form the plurality of substantially straight metallic lines. For example, the lines may be formed by elastically elongating and recovering the thin film substrate to enable the formation of said metallic lines.

The material layers may be patterned and etched without patterning any of the one or more materials with photolithographic techniques.

According to another embodiment of the invention, a wire grid polarizer comprises a plurality of substantially-straight metallic lines of predetermined periodicity Λ formed on a thin film substrate. The lines cover a region greater than about 4 centimeters, 20 centimeters or 40 centimeters in length and greater than about 4 centimeters, 20 centimeters or 40 centimeters in width, wherein the periodicity Λ is between about 10 nanometers and about 500 nanometers.

According to another embodiment, a direct view display apparatus comprises a source of backlight, a liquid crystal display and a wire grid polarizer disposed between the source of backlight and the liquid crystal array. The liquid crystal display may be disposed between the wire grid polarizer and a second polarizer. The second polarizer may be configured to transmit light transmitted by the wire grid polarizer.

The preceding and other features of the invention will become further apparent from the detailed description that follows. Such description is accompanied by a set of drawing figures. Numerals of the drawing figures, corresponding to those of the written text, point to the features of the invention with like numerals referring to like features throughout both the written description and the drawing figures.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 5A through 5K are a series of views for illustrating the method for forming a plurality of substantially-parallel metallic lines on an elastomeric substrate according to an embodiment of the present invention.

DETAILED DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

A first embodiment of the present invention provides a method for forming a wire grid polarizer characterized by parallel conductive lines of periodicities suitable for operation in the visible and infrared spectra. Unlike prior art techniques that rely upon photolithography to achieve the requisite small periodicities, the method of the present does not employ any photolithography and is therefore not subject to the resultant limitation of device size and capital equipment cost attendant to photolithographic processes. As such, large-scale wire grid polarizers, e.g., greater than about 10 centimeters long by 10 centimeters wide, may be fabricated.

As used herein, the terms "photolithography" and "photolithographic techniques" generally refer to processes wherein light-sensitive material (e.g., photoresist) is coated on the surface of a substrate material which may or may not have coatings on it and then exposed to a pattern of light and dark regions. The light-sensitive material is modified in the regions exposed to the illumination and substantially unchanged in unexposed regions. The exposed regions become either more soluble (positive photoresist) or less soluble (negative photoresist) in a subsequent developing (dissolving) procedure. The pattern of light and dark regions is typically (although not exclusively) formed with a photo-mask used in conjunction with a very sophisticated piece of equipment known as a mask aligner. The low throughput and high cost of both the mask aligner (typically several million dollars) and the ultra-clean room needed to house it makes this a relatively expensive manufacturing process.

As used herein, the term "without patterning the one or more materials with photolithographic techniques" refers generally to fabrication processes that do not require the use of a mask aligner or similar sophisticated and expensive piece of equipment in the process of patterning the substrate for the metal lines of the wire grid polarizer. It is noted that the term "without patterning the one or more materials with photolithographic techniques" does not exclude the use of photolithographic techniques for fabrication of a master for patterning the one or more materials.

Figure 5G:
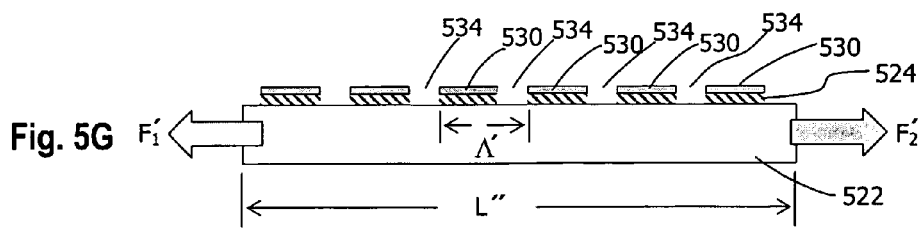

FIGS. 5A through 5K illustrate the process of the invention for forming a wire grid polarizer suitable for operation, inter alia, at visible and infrared wavelengths. The process is begun by providing a substrate 522 comprising a thin film of elastomeric material having an unstressed length "L" and suitable elastic modulus as illustrated in FIG. 5A. An example of an appropriate elastomeric film for the substrate 522 is one of 100 micron thickness poly (dimethylsiloxane) which is commercially available from Dow Corning Corporation of Midland, Mich. under the trademark SYLGARD 184. Such material is formulated to possess an elastic capacity permitting it to be axially stretched to up to 100 percent of its length without yielding (some formulations can exceed 200% stretching without yielding). As used herein, the term "without yielding" means without inelastic (i.e., permanent) deformation. Opposed uniaxial stretching forces $F_1$ and $F_2$ are applied to the substrate 522 in FIG. 5B to elongate it to "L'".

Figure 5H:
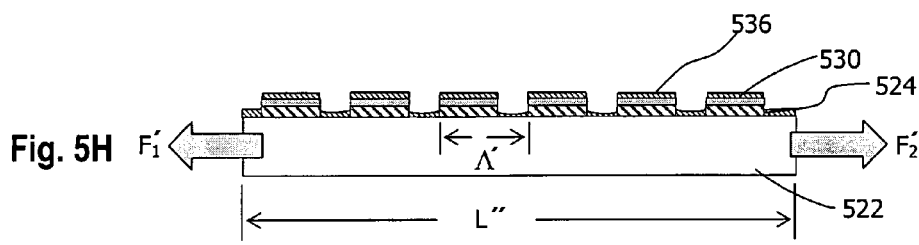
Figure 5I:
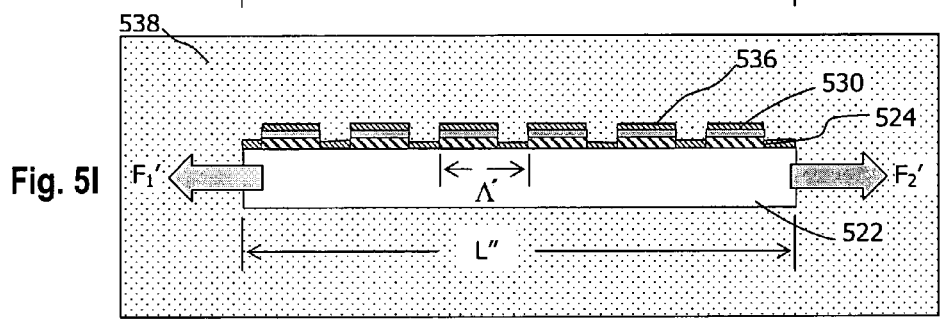
Figure 5J:
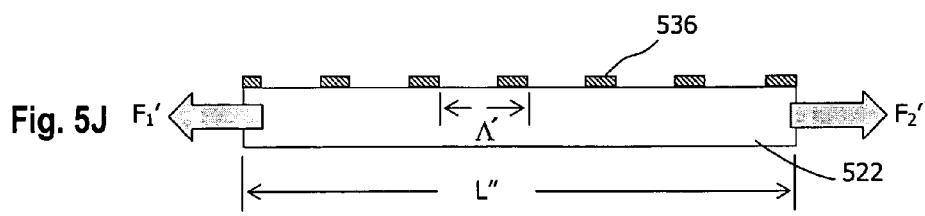
Figure 5K:
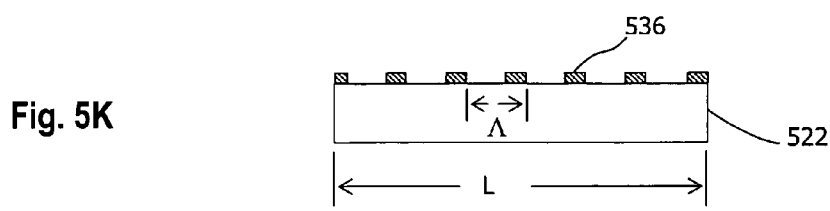
Figure 5L:
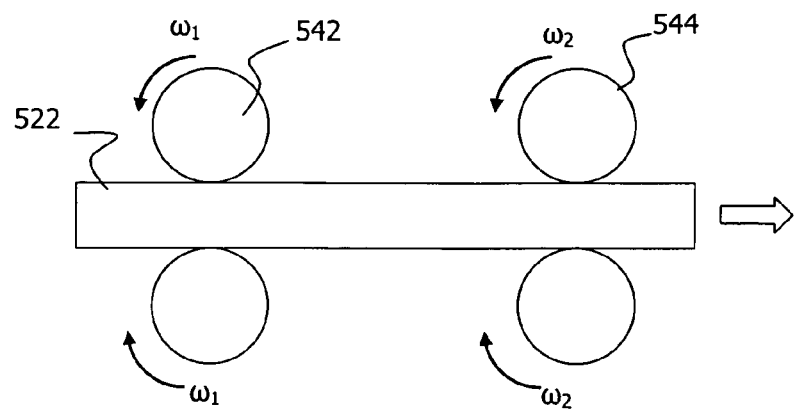
FIG. 5L is a cross-sectional schematic diagram illustrating stretching a substrate according to an embodiment of the present invention.

By way of example and without limitation, as illustrated in FIG. 5L, the stretching forces $F_1$ and $F_2$ may be applied to the substrate in a roll-to-roll environment by passing the substrate 522 through two spaced-apart pairs of pinch rollers 542, 544 that move with different tangential speeds, e.g., two pairs of identical sized pinch rollers that rotate at different angular speeds $\omega_1$ and $\omega_2$. If the downstream pinch rollers 544 have a higher tangential speed than the upstream rollers 542, the two pairs of pinch rollers 542, 544 can apply stretching forces directed longitudinally along the substrate 522.

In FIG. 5C, the stressed substrate 522 is coated with a material forming an overlying sacrificial layer 524. The sacrificial layer 524 may be formed by any suitable technique, e.g. by depositing a sacrificial material on a surface of the substrate 522 or by reacting the surface of the substrate, e.g., with a plasma or other reactive environment, to form the sacrificial layer 524. Preferably, the sacrificial layer is of a thickness between about 0.01 micrometers (μm) and about 10 μm, more preferably, between about 0.1 μm and about 0.5 μm. The material of the sacrificial layer 524 preferably comprises a water-soluble polymer that is readily susceptible to a reactive ion etch process. Other materials are suitable for the sacrificial layer 524, subject to (1) susceptibility to a reactive etch process and (2) use of a suitable solvent for performing and effecting a lift-off process described below.

Water soluble polymers suitable for the sacrificial layer 524 fall into several classes, a selection of which are listed below:

(1) Polymers with carboxylic acid groups and their salts with monovalent cations: poly(acrylic acid); poly(methacrylic acid); poly(maleic acid); their sodium, potassium, and ammonium salts.
(2) Polymers with amide groups: poly(acrylamide); poly(methacrylamide).
(3) Polymers with groups that have hydroxyl substituents: poly(hydroxyethyl acrylate); poly(2-hydroxypropyl methacrylate); poly(vinyl alcohol).
(4) Polymers with many ether groups, and possibly some hydroxyl end groups: poly(ethylene glycol); a polymer of poly(ethylene glycol) monomethacrylate.
(5) (Polymers with sulfonic acid groups or their salts with monovalent cations: poly(styrenesulfonic acid); poly(styrenesulfonic acid, sodium salt); poly(vinylsulfonic acid, sodium salt).
(6) Polymers that have many imine or amine groups: poly(ethylene imine); poly(vinylamine).
(7) Polymers that are linear chains of sugar groups: agar; soluble starches; hydroxyethylcellulose.
(8) Polymers that are linear chains of amino acids, or have cyclized amino acid groups: gelatin; poly(vinylpyrrolidone).
(9) Phenol-formaldehyde resins in the form of their sodium salts: resole.
(10) Combinations in copolymers, including some containing units that are not water soluble: poly(acrylamide-co-acrylic acid); poly(maleic acid-co-methyl vinyl ether); poly(vinyl alcohol-co-vinyl acetate); poly(vinylpyrrolidone-co-vinyl acetate).

The sacrificial layer 524 is applied in liquid form onto the substrate 522 and thereafter allowed to dry in the atmosphere. Alternatively, the sacrificial layer 524 may be deposited onto the substrate 522 in a vacuum evaporator or formed as a separate film and thereafter laminated onto the stressed film of the substrate 522.

As shown in FIG. 5D, removal of the axial stretching forces $F_1$ and $F_2$ from the substrate 522 results in its approximate return to original length L and buckling of the sacrificial layer 524. Such buckling results in an undulating topology comprising parallel rows of ridges 526 and valleys 528. According to buckling theory, the resultant periodicity Λ of such undulations may be determined in accordance with the following relationship:

$$\Lambda/t = [\pi^2 E_2 / 6(1-v_1^2)E_1(\delta L/L)]$$

Where:
t=thickness of the deposited layer 524
$E_1$=Young's modulus of the substrate 522.
$E_2$=Young's modulus of the deposited layer 524
$v_1$=Poisson's ratio of the substrate film 522.
L=original length of the substrate 522 before stretching
$\delta L = L'-L$ is the change in length of substrate film 522 when stretched just prior to depositing layer 524.

Young's modulus (sometimes referred to as the modulus of elasticity) generally refers to a measure of the stiffness of a given material. It is defined as the limit for small strains of the rate of change of stress (the stretching force divided by the cross-sectional area of the substrate 522 perpendicular to the stretching force) with strain ($\delta L/L$). Poisson's ratio is a measure of the tendency for a material stretched in one direction to get thinner in the other two directions. Poisson's ratio is defined as the lateral contraction per unit breadth divided by the longitudinal extension per unit length ($\delta L/L$).

Embodiments of the present invention may use of other materials and processes to develop a similar surface topography for fabrication of wire grid polarizers. For example, N. Bowden et al, in "The controlled formation of ordered, sinusoidal structures by plasma oxidation of an elastomeric polymer", Applied Physics Letters Volume 75, Number 17, 25 October 1999, which is incorporated herein by reference, describes a process in which plasma surface treatments of an elastomeric substrate result in a rippled surface similar to that depicted in FIG. 5D. Such a technique for generating waves on polydimethylsiloxane (PDMS) patterned in bas-relief. The PDMS is heated, and its surface oxidized in an oxygen plasma. The oxidation forms a thin, stiff silicate layer on the surface. When the PDMS cools, it contracts and places the silicate layer under compressive stress. This stress is relieved by buckling to form patterns of waves with wavelengths from 0.5 to 10 μm. The waves are locally ordered near a step or edge in the PDMS. The wavelength, amplitude, and pattern of the waves can be controlled by controlling the temperature of the PDMS and the duration of the oxidation.

As shown in FIG. 5E a masking layer 530 comprising a thin film of either metallic or dielectric material is deposited, e.g., by a vacuum deposition process, at an oblique angle 532 onto the above-described topology of the sacrificial layer 524. As can be seen, the resultant deposited masking layer 530 is characterized by a continuum of alternating thicknesses that repeat and track the periodicity Λ of the undulations of the sacrificial layer 524. In general, greater thicknesses of the masking layer 530 are created at portions overlying where the undulating sacrificial layer 524 is to the "windward" side of the oblique angle 532 deposition while lesser thicknesses are deposited at portions overlying areas of the sacrificial layer 524 that are "leeward" to the oblique deposition. Oblique deposition of a thin metallic layer onto a buckled surface topology to form a metal layer that is periodically thicker and thinner for subsequent fracture upon stressing to form parallel metal lines is taught by F. Katzenberg, "Cost-Effective Production of Highly Regular Nanostructured Metallization Layers", *Nanotechnology*, vol. 14 (2003), pp. 1019-1022.

Figure 5M:
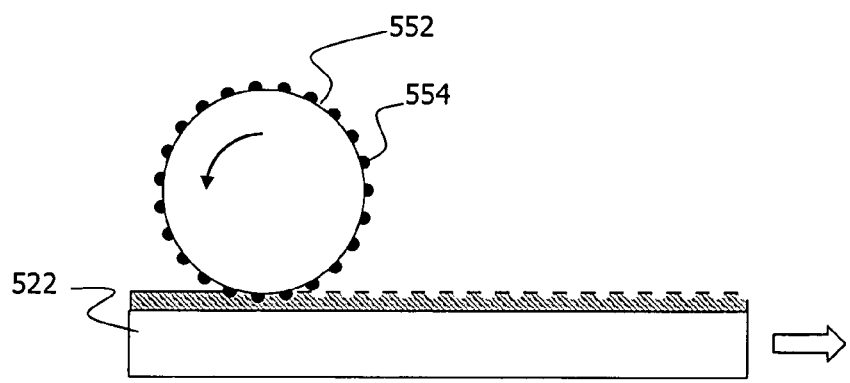
FIG. 5M is a cross-sectional schematic diagram illustrating formation of a nanometer-scale rippled surface using a nano-imprint roller according to an embodiment of the present invention.
Figure 5N:
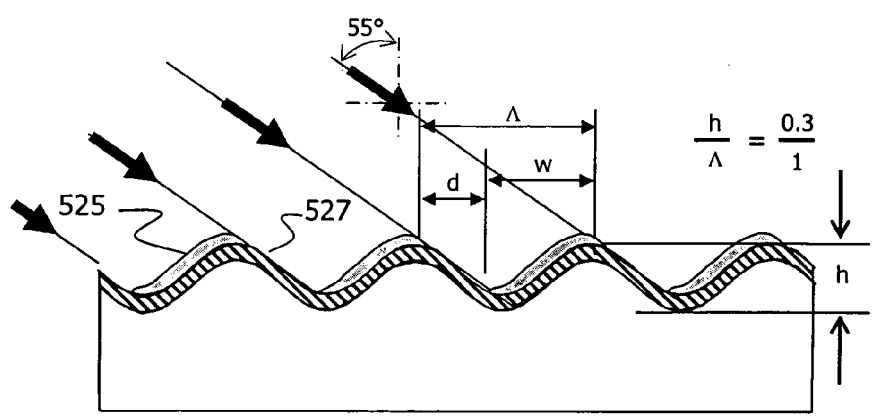
FIG. 5N is a cross-sectional schematic diagram illustrating oblique deposition at an angle larger than about 45 degrees.

According to alternative embodiments of the present invention, the use of a dielectric material as the masking layer 530 is possible if the masking layer 530 does not ultimately constitute the parallel conductive lines of the wire grid polarizer. Preferred metals for deposition include aluminum, silver, nickel, copper, tungsten and alloys of tungsten and titanium, all being metals that deposit upon the sacrificial layer 524 with low internal strain. Examples of appropriate dielectric materials for deposition as the masking layer 530 include, but are not limited to sodium chloride, silicon dioxide and silicon nitride, all being materials that fracture easily. The angle of incidence 532 is preferably larger than about 45 degrees. For angles near 45 degrees, the deposited material has thicker and thinner regions corresponding to the periodic surface relief structures. For deposition angles significantly larger than 45 degrees, e.g., 55 degrees as shown in FIG. 5N, the deposited coating may be discontinuous, with thick regions of buildup on the faces of the undulations facing the deposition source while no deposit accumulates on the faces of the undulation that face away from the source. The result is a pattern of deposited strips of material 525 having width w separated by spaces 527 of width d. By way of example, such a discontinuous coating may be formed where the height h of the periodic relief structures the substrate surface is about 0.3Λ.

For deposition angles in the neighborhood of 45 degrees, wherein the deposited layer is not discontinuous, just thicker and thinner, axially-directed Forces $F_1'$ and $F_2'$ are then applied as shown in FIG. 5F, elongating the elastomeric substrate 522 to l". Such elongation of the substrate 522 results in fracturing of the masking layer 530 at its periodically-distributed thinned regions, causing the formation of periodically-distributed parallel lines of material of the masking layer 530 separated by spacings 534. Since the sacrificial layer 524 was deposited, as illustrated in FIG. 5C, onto the then-elongated (to L') substrate 522, the net tensile force resulting from the forces $F_1'$ and $F_2'$ must exceed that originally applied as the stressed length of the substrate 522, L", must exceed the prior stressed length L' for fracturing of the sacrificial layer 524 to occur. Also, the periodicity of the periodically-distributed lines of the masking layer assumes a new value Λ' that somewhat exceeds Λ due to the increased stressed length (L" versus L') of the substrate 522.

The widths of the spacings 534 are preferably between λ/5 and λ/10, where λ is a characteristic wavelength of light or other radiation that is to be polarized by a wire grid polarizer manufactured as described herein. Such spacings 534 will be seen to determine the widths of the parallel conductive (metal) lines of a wire grid polarizer formed by the process described herein. Preferably, the periodicity of the parallel conductive lines is about λ/3 or less for the resulting device to function efficiently as a polarizer.

The device is then subjected to a reactive ion etch process while axial forces $F_1$ and $F_2$ continue to be applied and the spacings 534 maintained. In such a process, the device may be placed in a vacuum processing chamber where the reactive ion etching process removes the portions of the sacrificial layer 524 exposed by the spacings 534 while the periodically-distributed portions of the masking layer 530 protect underlying portions of the sacrificial layer 524, leaving the structure illustrated in FIG. 5G.

A thin metallic layer 536 is then vacuum deposited over the surface while the elastomeric substrate 522 continues to be stretched. The evaporant forming the thin metallic layer 536 is preferably normally incident upon the surface of the substrate 522 to facilitate subsequent lift-off, discussed below. Periodically-distributed portions of the thin metallic layer 536 will be seen to form the conductive lines of the wire grid polarizer formed by the process herein. Materials suitable for forming the thin metallic layer include, but are not limited to, aluminum, gold, silver and nickel. Each of such materials is characterized by, among other characteristics, good reflection in the wavelengths of interest. As can be seen in FIG. 5H, the thin metallic layer 536 alternately coats the spacings 534 and the periodically-distributed portions of masking layer 530 that overlie the sacrificial layer 524. However, the metallic layer is sufficiently thin relative to the thickness of the sacrificial layer that the sides of strips of the sacrificial layer 524 under the periodically distributed portions of the masking layer 530 are exposed As depicted in FIG. 5I, the stressed device is immersed in a solvent 538 capable of dissolving the sacrificial layer 524. In the event the layer 524 comprises a water soluble polymer, as discussed above, water is a suitable choice of solvent. The solvent can access the sacrificial layer 524 from the exposed sides described above. This results in dissolution of the remaining water soluble polymer material of the sacrificial layer 524, causing lift-off of the overlying layers 530 and 536. The result of such process is illustrated in FIG. 5J. As can be seen, only the periodically-distributed portions of the thin metallic layer 536 remain.

The axial forces $F_1'$ and $F_2'$ for elongating the elastomeric substrate 522 to L" are then removed, leaving it to return to substantially its original dimensions with the periodicity of the parallel conductive lines formed of the sections of the thin metallic layer 536 that remain after the lift-off process being reduced from Λ' to the predetermined value of Λ. The resultant wire grid polarizer is shown in FIG. 5K.

Those of skill in the art will recognize that there are many variations on the technique described above for forming the desired ripple patter on the sacrificial layer 524 and/or substrate 522. For example, as illustrated in FIG. 5M, a sacrificial layer in the form of a resist 550 may be formed on a surface of the substrate and patterned with periodic surface relief structures using a nano imprint roller 552. The nano-imprint roller has a plurality of linear features 554 having the desired nanometer-scale periodicity Λ'. This periodicity is transferred to the resist 540. A similar technique may alternatively be used to pattern the substrate 522 itself.

Thus it is seen that the above embodiments of the present invention addresses the problems that have plagued the fabrication of wire grid polarizers of sufficiently small periodicities by providing a fabrication process characterized by (1) using a separate sacrificial coating material to form the thin buckling layer (the sacrificial layer 524), (2) selectively removing portions of the sacrificial coating material by a reactive ion etching, (3) depositing a thin metal layer (the thin metal layer 536) of composition and thickness chosen for optical performance and (4) employing a lift-off process that relies upon the solubility of the sacrificial layer to remove unwanted structures later.

In addition, step-and-repeat nano-imprint techniques may be used to form periodic surface relief structures (e.g., as shown in FIG. 5D) or to form the conductive lines of a wire grid polarizer. For example, FIGS. 6A-6E illustrates a soft nano-imprint lithography technique that may be adapted to implement embodiments of the present invention. In such a technique a master 602 is fabricated having on a surface thereof a pattern of raised features 604 and spaces 606. The pattern of features on the master 602 is an inverse of a pattern that is to be transferred to an elastomeric stamp 608. Preferably, the pattern of features is characterized by a pitch of between about 20 nm and about 500 nm with features between about 10 nm and about 200 nm wide. Such features may be formed in a suitable substrate using electron beam lithography. Examples of suitable substrates include, e.g., silicon or a thin (e.g., 300 nm) layer of polymethyl methacrylate (PMMA) on an underlying silicon substrate.

Figure 6A:
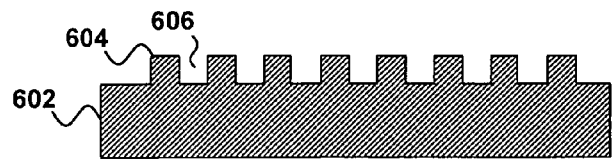
FIGS. 6A-6E are cross-sectional schematic diagrams illustrating formation of a nanometer-scale rippled surface using nano-imprint stamp lithography according to an embodiment of the present invention.
Figure 6B:
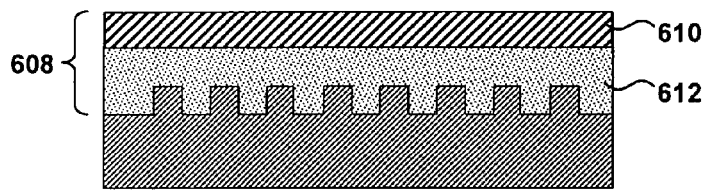

The stamp 608 may include a rigid backplane 610 and an elastomer layer 612. In an uncured or partially cured state the elastomer layer 612 is pressed against the pattern on the master 602 as shown in FIG. 6B. The elastomer layer 612 may subsequently be cured to fix the transferred pattern from the master 602. To attain reliable and repeatable conformal contact and relatively defect-free separation with the stamp 610, it is desirable for the stamp to exhibit a relatively low and defined Young's modulus and high toughness to avoid local overload and defects caused by brittle failure of vulnerable features. It is also desirable for the stamp to exhibit sufficient elastic behavior to allow the stamp to recover its original shape even after having undergone significant strain (e.g., about 25% or more). Furthermore, it is desirable for the stamp 610 to exhibit a low work of adhesion to facilitate separation of the stamp from the master at low force and to prevent the sticking of particles to the substrate. By way of example, the elastomer layer 612 may be a layer of a siloxane elastomer material, such as poly(dimethylsiloxane). The choice of elastomer material also depends partly on the size of the features to be printed. Generally, smaller features may require the use of an elastomer with a higher Young's modulus.

Figure 6C:
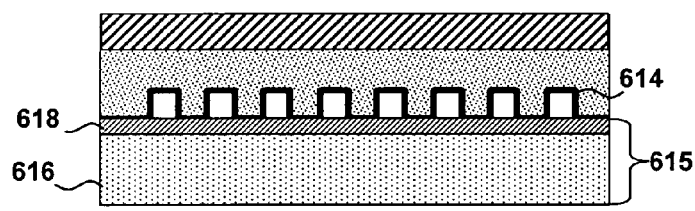

As shown in FIG. 6C, the pattern on the elastomer layer 612 of the stamp 608 may be coated with a resist 614, e.g., by immersion or through contact with an ink pad (not shown). Preferably, the resist is of a type that forms a self assembled monolayer when the printed onto a substrate. The choice of material for the resist 614 is partly dependent upon the material of the substrate onto which the resist is to be printed and partly on whether the elastomer layer 612 can be inked with the resist 614. By way of example alkanethiols may form self assembled dense ordered monoloayers on gold, silver and copper and may be printed using stamps made of siloxane elastomers such as PDMS. Examples of suitable alkanethiols include dodecanethiol ($CH_3(CH_2)_{11}SH$) and hexadecanethiol ($CH_3(CH_2)_{15}SH$).

Figure 6D:
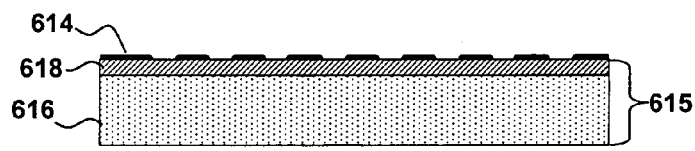
Figure 6E:
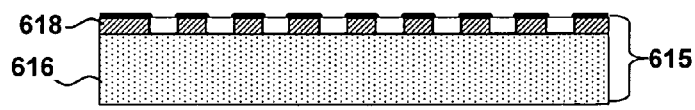

Contacting the resist coated elastomer layer 612 of the stamp 608 against a surface transfers the resist 614 from raised portions of the stamp 614 to the surface of a substrate 615. The result is a pattern of self-assembled monolayers of the resist 614 on the surface of the substrate 615, as shown in FIG. 6D. By way of example, the substrate 615 may include a layer of a metal 618, such as gold, copper or silver on a polymer underlayer 616. Portions of the substrate 615 that are not covered by the resist 614 may be etched using a suitable etch process as shown in FIG. 6E. By way of example, gold may be etched using a 0.1 molar solution of cyanide in 1 molar potassium hydroxide (KOH) saturated with oxygen. Etching of the metal layer 618 may form a pattern of spaced-apart metal lines on the underlying polymer 616. Any remaining resist 614 covering the metal lines may be regarded as a sacrificial layer that can be removed.

Figure 6F:
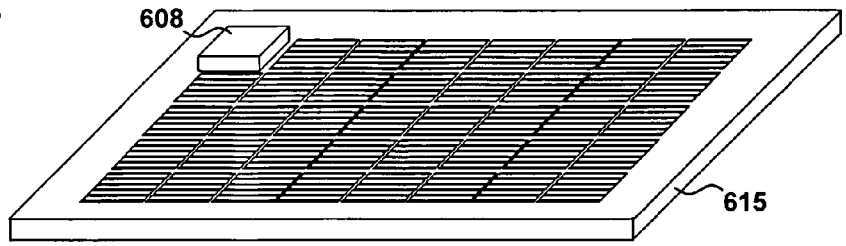
FIG. 6F is a three-dimensional schematic diagram illustrating formation of a nanometer-scale relief structured surface for a wire grid polarizer using step-and-repeat nano-imprint stamp lithography according to an embodiment of the present invention.

If the size of the stamp 608 is limited, the above-described technique can be used to produce large area wire grid polarizers though use of a step-and-repeat lithography as illustrated in FIG. 6F. Specifically, the stamp 608 applies a resist pattern to a portion of the substrate 615 and is then moved to an adjacent portion where the resist pattern is repeated. Once the pattern covers a large enough area of the substrate 615 the substrate may be etched to produce a rippled surface pattern. The stepper used to move the stamp 608 or substrate 615 may have a wide range of tolerance on the stepping, e.g., between about 1 µm to about 25 µm. It is noted that the stepping tolerance is a function of efficiency and not a knock out defect issue.

Figure 6G:
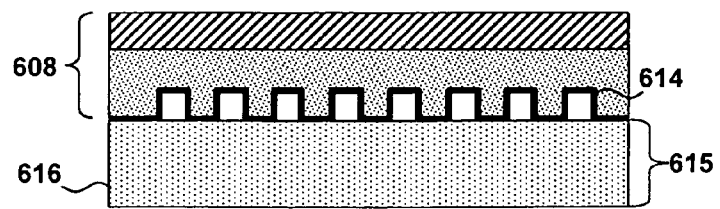
FIGS. 6G-6J are cross-sectional schematic diagrams illustrating formation of a wire grid polarizer using nano-imprint stamp lithography and oblique metal deposition according to an embodiment of the present invention.
Figure 6H:
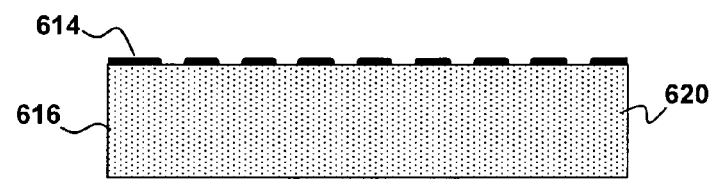
Figure 6I:
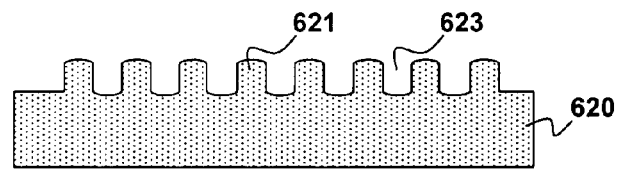
Figure 6J:
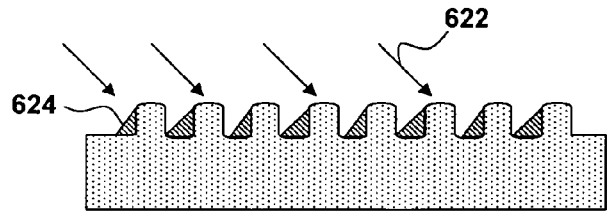

In a variation on the technique shown in FIGS. 6A-6E a wire grid polarizer may be fabricated using nano-imprint stamp lithography and oblique metal deposition according to an embodiment of the present invention. Specifically, a nano-imprint stamp 608 may be fabricated as described above with respect to FIGS. 6A-6B. The stamp 608 may be coated with a resist 614 of a type that forms a self assembled monolayer when the printed onto a substrate 620. When the resist coated surface of the stamp 608 is pressed against the surface of the substrate 620 a pattern of resist 614 is transferred to a transparent substrate 620 (e.g., glass or a polymer) as shown in FIG. 6G. The resist forms a pattern as shown in FIG. 6H and as described above with respect to FIG. 6C. The substrate 620 can then be etched through openings in the patterned resist 614 leaving a periodic relief structure in the surface of the substrate 620 pattern of ridges 621 and valleys 623 as shown in FIG. 6I. Metal 622 can then be deposited at an oblique angle (e.g., greater than 45 degrees as discussed above with respect to FIG. 5N) over the pattern of ridges 621 and valleys 623. By appropriate choice of the periodicity λ, the depth of the valleys and the angle of oblique deposition, the oblique deposition may form a pattern of metallization 624 having spaced apart metal lines that form the wires for a wire grid polarizer.

In another alternative embodiment, a master may be used for direct stamping of a wire grid pattern into a deformable substrate (e.g., a suitable polymer) through a hot or cold stamping technique similar to that used in compact disc (CD) or Digital Video Disc (DVD) fabrication. The wire grid pattern on the master may be fabricated using electron beam lithography or laser etching of the pattern into a highly polished glass master substrate coated with photoresist. The photoresist is then cured, e.g., with ultraviolet light and uncured portions rinsed off. The surface of the glass master may then be etched through openings in the resist to form a pattern. A metal (e.g., nickel or silver mold) may then be electroformed on top of the glass master. The metal mold may then be removed and electroplated, e.g., with a nickel alloy, to create one or more stampers. The stamper can be used to injection mold the wire grid pattern into a polymer (e.g., polycarbonate) substrate to form the rippled surface. Injection molding generally refers to a manufacturing method where molten material is forced into a mold, usually under high pressure, and then cooled so the material takes on the shape of a mirror image of a pattern on the mold.

The above referenced techniques allow for the manufacture of large scale wire grid polarizers characterized by a periodicity Λ between about 20 nanometers (nm) and about 500 nanometers, wherein the metallic lines of the polarizer cover a substrate area having dimensions of about 4 centimeters (or 20 centimeters or 40 centimeters) to about 10 kilometers in length and about 4 (or 20 centimeters or 40 centimeters) to 500 centimeters in width with metal lines ranging from about 10 nm to about 100 nm wide and about 5 nm to about 1000 nm thick. Such wire grid polarizers may be mass manufactured at a cost between about $1 per square meter and about $100 per square meter. The lack of a suitable technique for manufacturing wired grid polarizers on such a scale has previously presented an impediment to the use of such polarizers in direct view display applications. By way of contrast, a wire grid polarizer fabricated using photolithographic techniques involving the use of a mask aligner would cost about $80,000 per square meter.

Figure 7A:
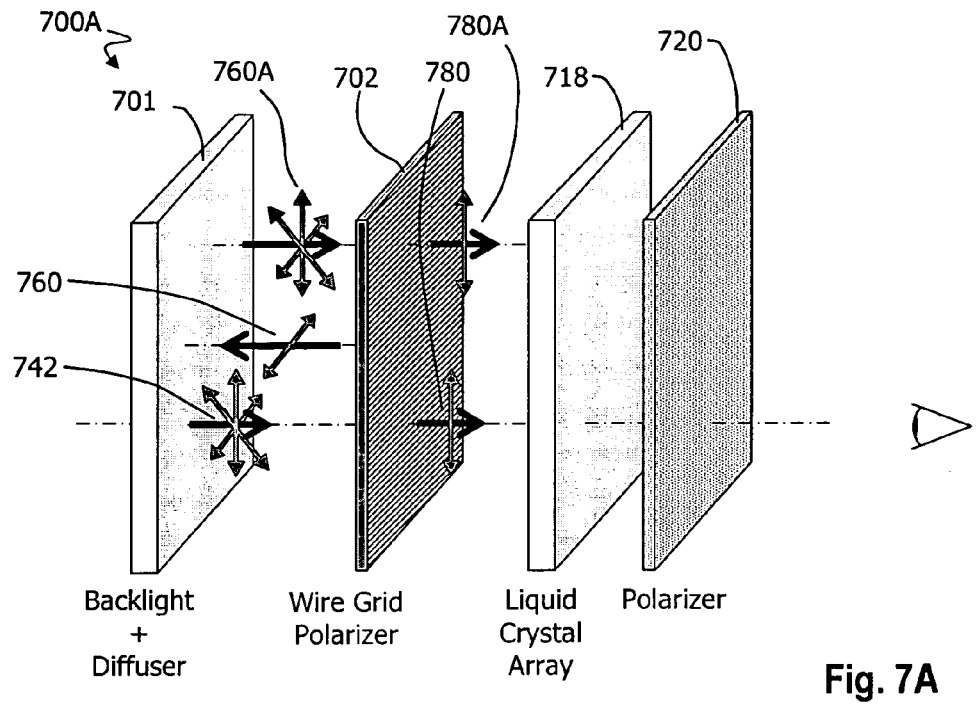
FIGS. 7A-7E are three-dimensional schematic diagrams of direct-view Liquid Crystal Display assemblies with wire grid polarizers according to an embodiment of the present invention.

Large scale wire grid polarizers manufactured, e.g., as described above, may be used in direct view display assemblies such as are used in liquid crystal displays for flat-screen monitors. For example, FIG. 7A illustrates an improved direct view LCD assembly 700A, according to an embodiment of the present invention. In the assembly 700, unpolarized light 742 is produced by backlight 701 where for simplicity, a light-diffusing function is presumed to be incorporated into the backlight 701. The unpolarized light 742 is incident on a wire grid polarizer 702 whereupon a portion is reflected 760 and a portion transmitted, 780. The transmitted light 780 directly illuminates an image generating device 718 such as a liquid crystal display (LCD) array while the reflected plane of polarization 760 is returned towards the backlight 701. The LCD array 718 may be placed between the wire grid polarizer 702 and a second polarizer 720 having its polarizing axis oriented in such a way as to transmit the transmitted light 780.

Figure 1:
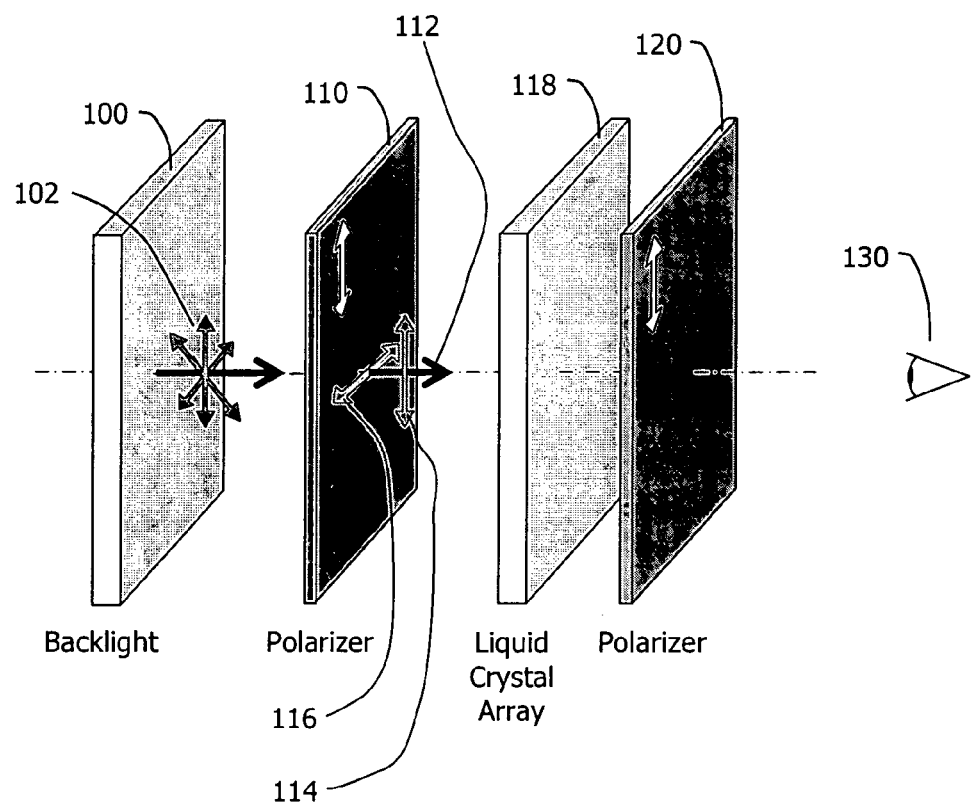
FIG. 1 is a three-dimensional exploded view of a portion of a direct-view Liquid Crystal Display assembly.
Figure 2:
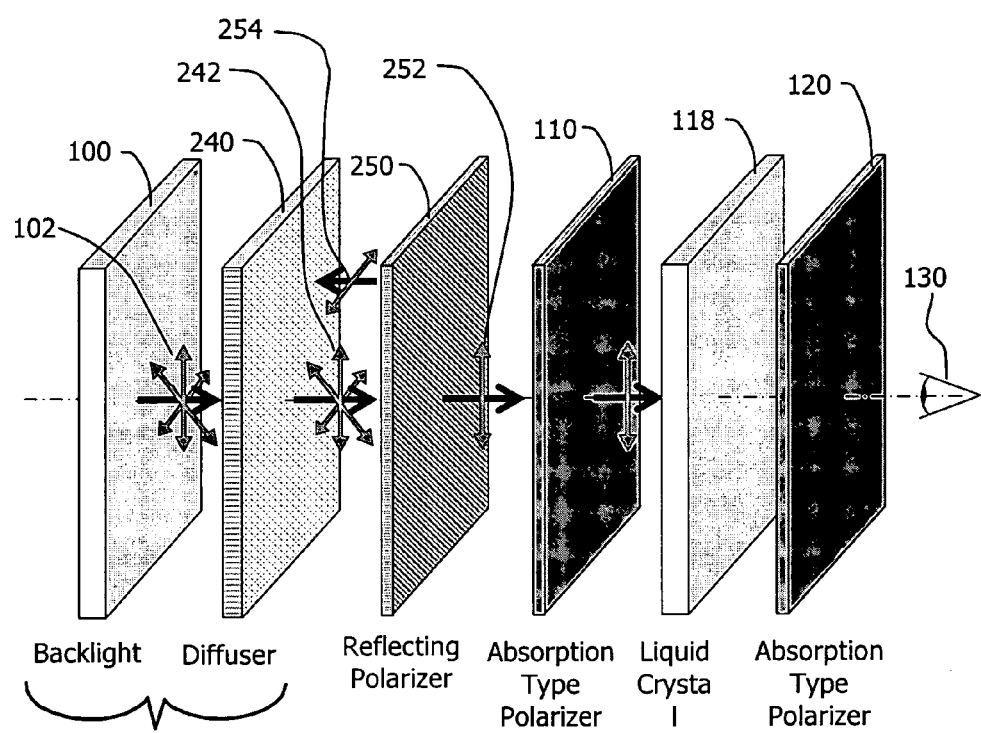
FIG. 2 is a three-dimensional exploded view of a portion of a direct-view display that uses a tandem pair of absorption polarizers.
Figure 3A:
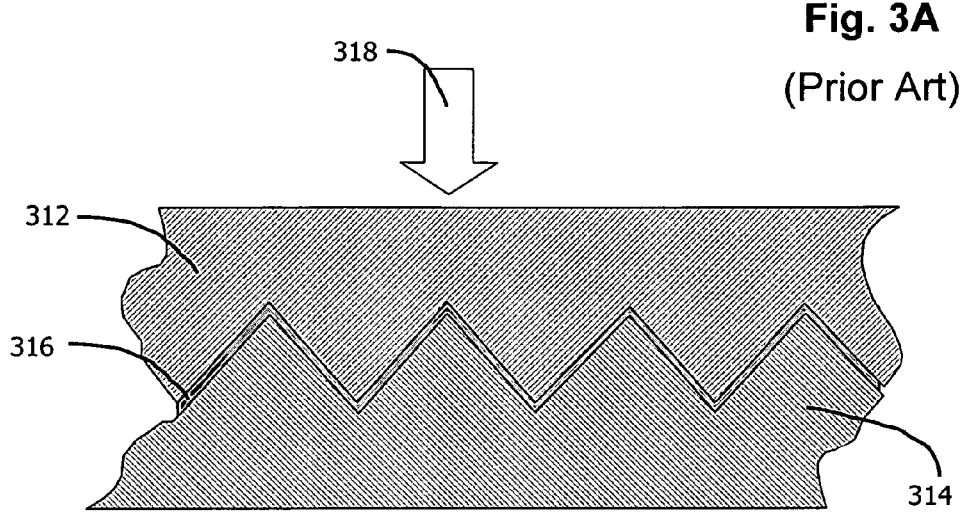
FIGS. 3A-3B is a cross-sectional view of an example of a prior art reflective polarizer.
Figure 3B:
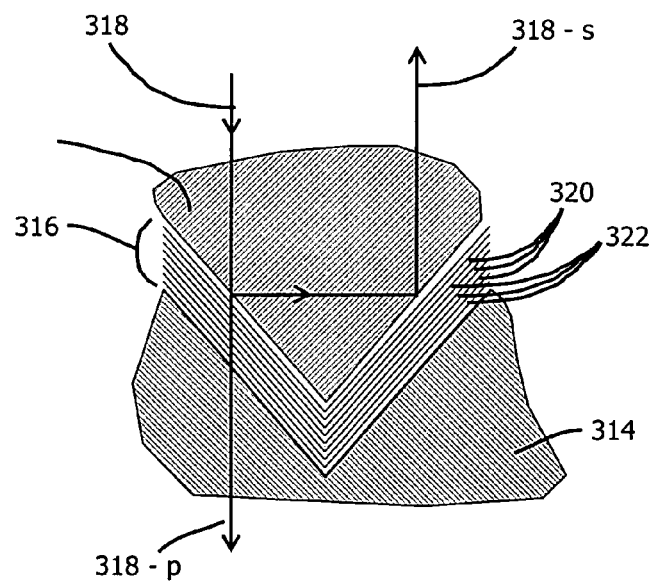
Figure 4:
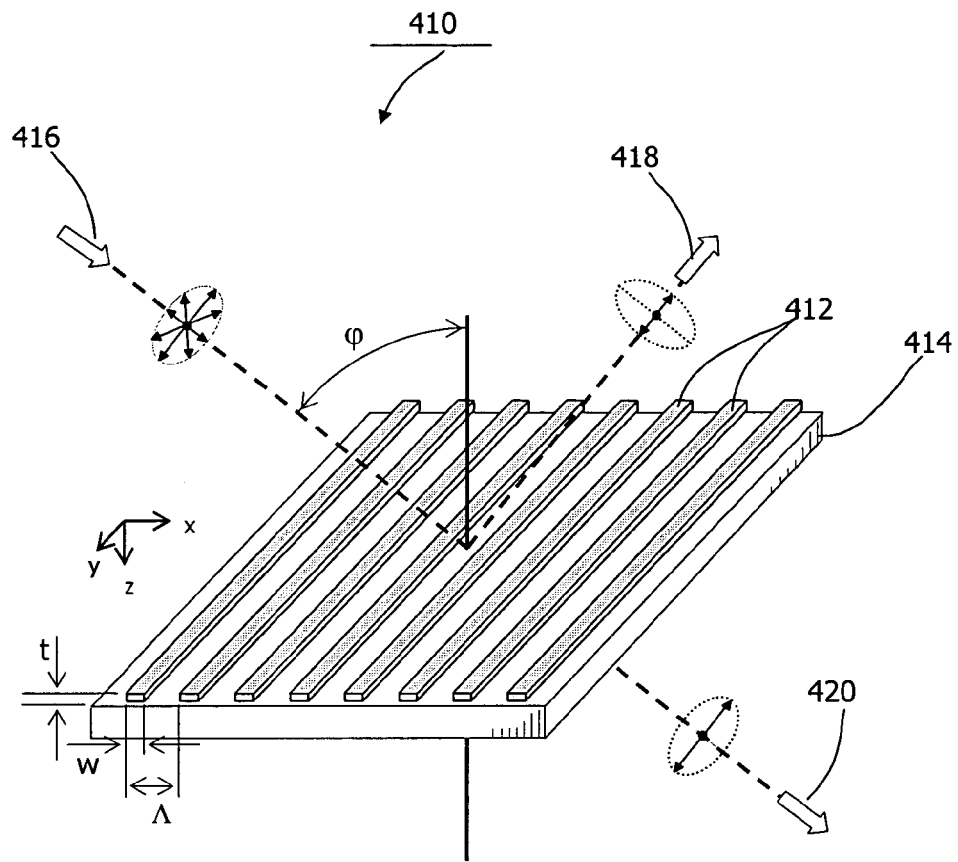
FIG. 4 is a perspective view of a wire grid polarizer of the prior art illustrating its principle of operation.

Wire grid polarizers are known to transmit a very high fraction (e.g., >90%) of the desired plane of polarization and essentially none (e.g., <0.01%) of the undesired plane of polarization. By contrast, the complex structure of prior art reflective polarizers used in direct-view LCDs transmits a significant fraction (e.g., >10%) of the undesired plane of polarization towards the LCD array. Thus, in LCD assemblies with prior art reflective polarizers, a secondary "clean-up" polarizer is required after the reflective polarizer to remove all of this transmitted light that has the undesired plane of polarization as shown as 252 in FIG. 2. In this tandem arrangement of polarizers between the backlight and the liquid crystal in the prior art designs, due to practical inefficiencies inherent in all polarizers, the overall transmission of the desired plane of polarization is significantly lower than in embodiments of the present invention which use a single wire grid polarizer. This improved transmission of the desired plane of polarization is the first of two factors that contribute to the improved optical efficiency of the present invention over prior art reflective polarizers.

Again referring to FIG. 7A the reflected light 760 is composed almost exclusively of the undesired plane of polarization (e.g., >90%). The plane of polarization of light 760 gets scrambled (i.e., the plane of polarization is not preserved upon reflection) while being diffusely reflected from the backlight 701. The polarization scrambled light 760A when reflected from the backlight 701 proceeds back again towards the wire grid polarizer 702. That fraction of the returned light 760A that is in the correct plane of polarization will be transmitted 780A by the wire grid polarizer 702 while the undesired plane of polarization is reflected once again (for clarity, this is not shown). The improved selectivity of wire grid polarizers over that of the prior art reflective polarizers leads to the second factor in the improved optical efficiency of the present invention. In the prior art designs, the light reflected from the complicated structure of reflective polarizers have a considerable fraction of the desired plane of polarization along with the undesired plane of polarization. In this reflection/scrambling process, the desired plane of polarization will be scrambled into the undesired plane of polarization whereupon it will be rejected (reflected) by the reflective polarizer and thereby must traverse the reflecting/scrambling process again with diminishing effectiveness. This process repeats, each time transmitting a fraction more of the originally un-useful orthogonal polarization.

Figure 7B:
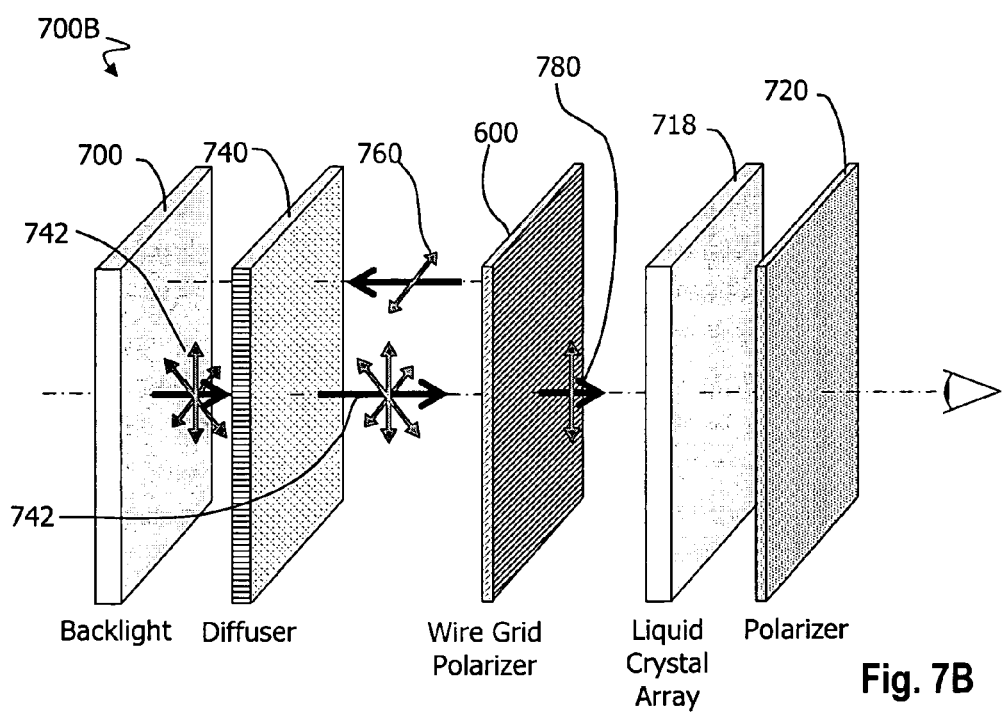
Figure 7C:
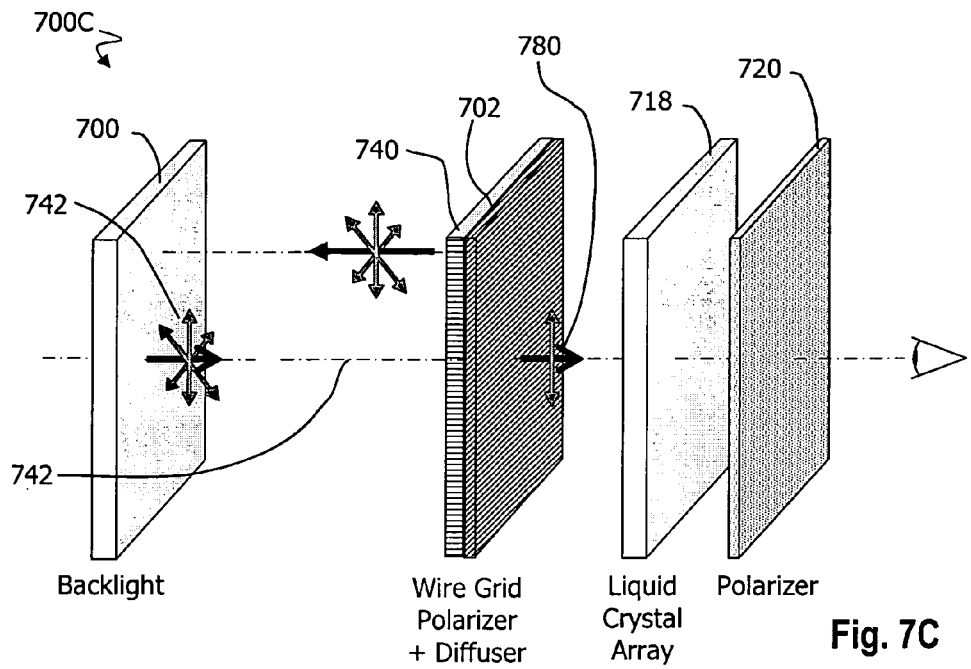

A number of variations are possible on the direct view display 700 of FIG. 7A. For example, as shown in FIG. 7B a direct view display 700B may have distinct layer diffuser 740 disposed between the back light 701 and the wire grid polarizer 702 to achieve the polarization scrambling function. Alternatively, as shown in FIG. 7C, a direct view display 700C may have diffuser 740 or its equivalent function integrally incorporated with the reflecting wire grid polarizer 702.

Figure 7D:
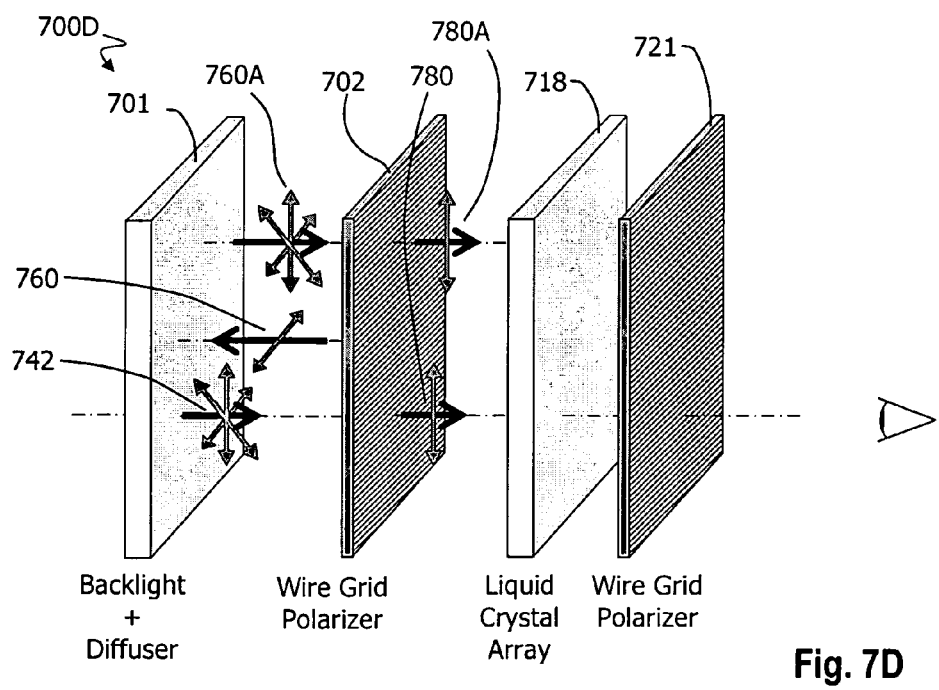

In addition, a number of possible types of polarizers may be used as the second polarizer 720, sometimes called the analyzer. For example as shown in FIG. 7D, a direct view display 700D may use a second wire grid polarizer 721 as the second polarizer in tandem with the wire grid polarizer 702. However, as illustrated in FIG. 7D, the intrinsic reflective nature is a significant problem when a wire grid polarizer is used as a front side polarizer. Ambient illumination sources 730 reflect strongly from the front wire grid polarizer 720 and diminish the contrast produced by the display 700D. Thus reflections 710 from ambient light sources 730 compete with the light emerging from the display 700D and thereby significantly diminish the contrast generated by the display. Thus, the use of tandem wire grid type polarizers may adversely impact the viewability of the display 700D.

Figure 7E:
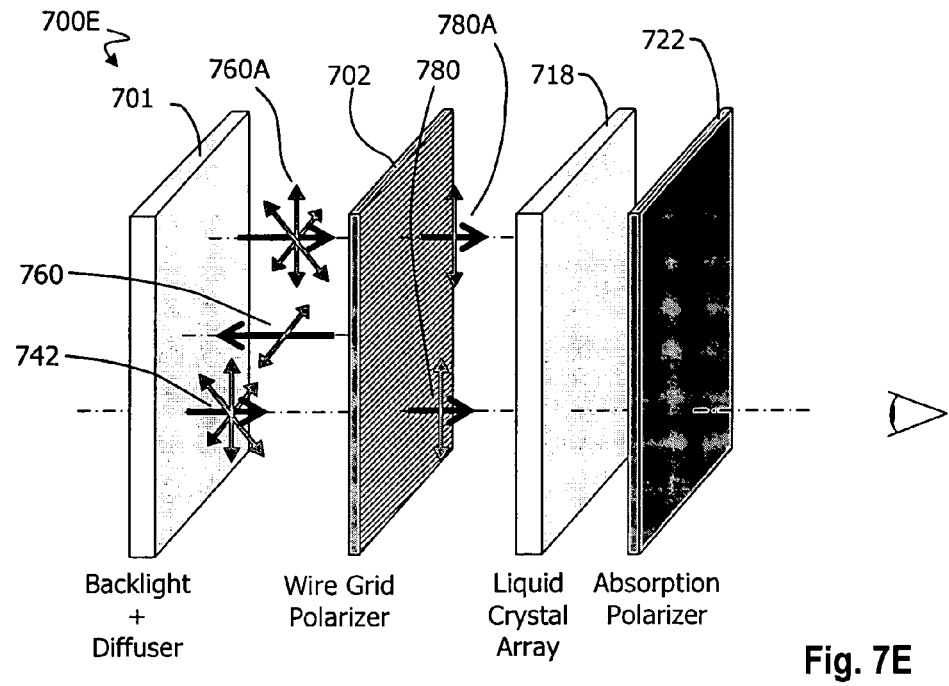

As an alternative to two tandem wire grid polarizers a direct view display 700E may use a wire an absorption-type polarizer 722 as the front side polarizer in tandem with the wire grid polarizer 702 as the back side polarizer as shown in FIG. 7E. This combination is innovative because the superior reflective polarization capabilities of wire grid polarizer 702 are optimal for the backside polarization function while the low reflectivity of the absorption type polarizer 722 are optimal for the front side polarization function.

Figure 7F:
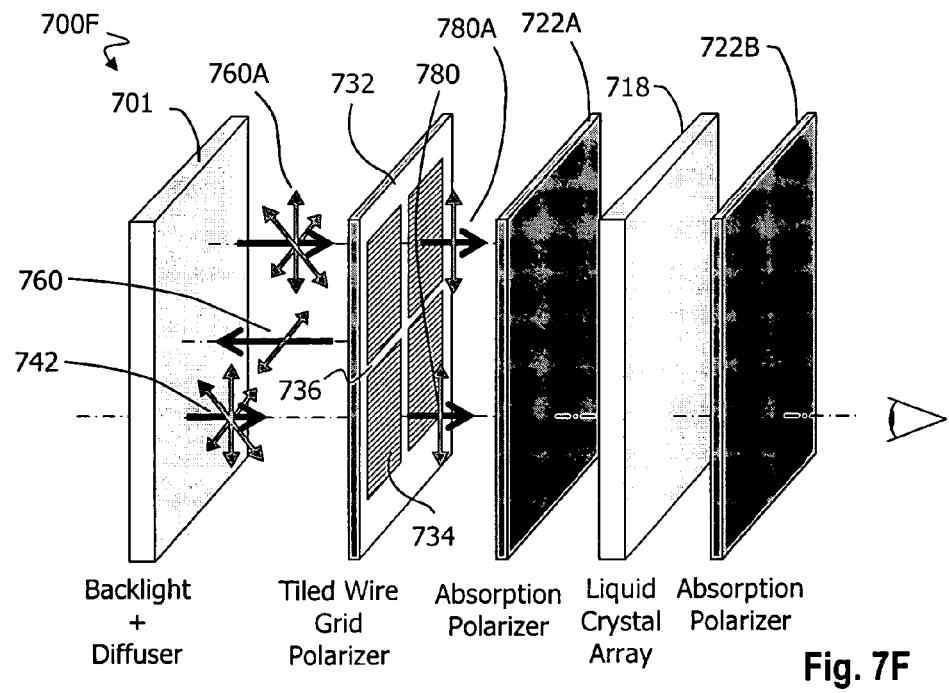
FIG. 7F is a three-dimensional schematic diagram of a direct-view Liquid Crystal Display assembly with a tiled wire grid polarizer according to an embodiment of the present invention.

In another alternative embodiment, a tiled wire grid polarizer 732 may be used in a direct view display 700F in tandem with first and second conventional absorption-type polarizers 722A, 722B as the as shown in FIG. 7F. The tiled wire grid polarizer 732 includes wire grid sections 734 separated by spaces 736. The tiled wire grid polarizer 732 may be fabricated, e.g., using step and repeat imprint lithography as described above. The image generating device 718, e.g., an LCD display, is disposed along an optical path between the two absorption-type polarizers 722A, 722B as in a conventional display. This combination is innovative because in the display industry, a tiled polarizer is normally considered something that is to be avoided since the spaces between the polarizing "tiles" would show up when viewing the display due to unpolarized light passing through the spaces 736. Therefore, the use of a tiled polarizer is highly counterintuitive to those of skill in the art. However, the second absorption type polarizer 722B can "clean up" unpolarized light passing through the spaces 736. Thus, if the wire grid sections 734 are sufficiently close to each other, the spaces 736 may be sufficiently imperceptible for the purposes of a commercially acceptable display. The spacing of the wire grid sections 734 may be determined empirically. The spacing of the wire grid sections 734 may be controlled using commercially available step and repeat imprint lithography techniques.

It is noted an important innovation of the preceding embodiments of the present invention compared to the prior art, is the use of a wire grid polarizer in such a direct view display applications. This innovation is important because of the superior reflective polarization capabilities of wire grid polarizers which enable the elimination of the "clean-up" polarizer 110 shown in FIG. 2 and thereby significantly simplifies the LCD manufacturing process, improves optical efficiency and lowers the cost of the LCD.

Embodiments of the present invention allow for economical volume production of large-scale wire grid polarizers. With embodiments of the present invention, one may realize the advantages of wire grid polarizer performance, including minimal energy absorption, temperature insensitivity and the resulting economies of low energy consumption and long life, at wavelengths requiring extremely small periodicities. In contrast to prior art techniques for forming such polarizers, the method of the invention is not limited by characteristics inherent in the use of photolithography, including small display size and substantial capital investment.

Embodiments of the present invention provide an optimal combination of types of polarizers for direct-view liquid crystal displays that overcome the shortcomings of the prior art devices. Embodiments of the present invention provide reflective polarizers for direct-view liquid crystal displays that overcome the shortcomings of the prior art devices. Embodiments of the present invention provide a reflective polarizer for direct-view liquid crystal displays that combines the two functions of polarization and polarization recovery into a single, simple layer. Such reflective polarizers are more efficient for direct-view liquid crystal displays. Embodiments of the invention also allow for simpler manufacturing LCDs by avoiding the use of a separate polarizer layer for achieving adequate display contrast. In addition, embodiments of the present invention allow for reduced cost of LCD assemblies by replacing the current complex and expensive polarization recovery layers with a single wire grid polarizer.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A direct view display apparatus, comprising
    a source of backlight;
    a liquid crystal array;
    a wire grid polarizer disposed between the source of backlight and the liquid crystal array, wherein the wire grid polarizer includes a plurality of spaced-apart metal lines on a polymer substrate, wherein the plurality of spaced-apart metal lines is characterized by a periodicity that is less than $\lambda/3$, where $\lambda$ is a wavelength for visible light; and
    a second polarizer, wherein the liquid crystal array is disposed between the wire grid polarizer and the second polarizer, wherein the second polarizer is configured to transmit light transmitted by the wire grid polarizer.

2. The apparatus of claim 1, further comprising an optical diffuser disposed between the source of backlight and the wire grid polarizer.

3. The apparatus of claim 1, further comprising an optical diffuser integrated into the backlight source.

4. The apparatus of claim 1, further comprising an optical diffuser integrated into the wire grid polarizer.

5. The apparatus of claim 1 wherein the second polarizer is a wire grid polarizer.

6. The apparatus of claim 1 wherein the second polarizer is an absorption-type polarizer.

7. The apparatus of claim 6, further comprising a third polarizer, wherein the third polarizer is an absorption-type polarizer, wherein the liquid crystal display is disposed between the second and third polarizers, and wherein the wire grid polarizer is a tiled wire grid polarizer having a plurality of wire grid sections separated by spaces.

8. The apparatus of claim 7, wherein the wire grid sections are sufficiently close to each other that, when viewed through the third polarizer, the spaces appear sufficiently imperceptible for the purposes of a commercially acceptable display.

9. The apparatus of claim 1 wherein the wire grid polarizer includes a plurality of substantially-straight metallic lines of predetermined periodicity $\Lambda$ formed on a thin film substrate, wherein the lines cover a region approximately 4 centimeters to about 200 centimeters in length and approximately 4 centimeters to about 200 centimeters in width, wherein a space between adjacent metal lines in the plurality has a width between $\lambda/10$ and $\lambda/5$.

10. The apparatus of claim 9 wherein said thin film substrate is transparent.

11. The apparatus of claim 9 wherein said thin film substrate is made of a polymer material.

12. The apparatus of claim 9 wherein said substrate comprises poly(dimethylsiloxene).

13. The apparatus of claim 9 wherein the plurality of substantially-straight metallic lines of predetermined periodicity $\Lambda$ are formed on the thin film substrate by creating a plurality of substantially straight nanometer-scale periodic surface relief structures on a surface of the substrate, wherein the periodic surface relief structures cover a region greater than about 4 centimeters in length and greater than about 4 centimeters in width, wherein the periodicity $\Lambda$ is less than $\lambda/3$, where $\lambda$ is a wavelength for visible light; and forming one or more layers of material on the periodic relief structures, the one or more layers including one or more conductor materials that form the plurality of substantially straight metallic lines over a region of the substrate greater than about 4 centimeters in length and greater than about 4 centimeters in width, wherein the periodicity $\Lambda$ is less than $\lambda/3$, where $\lambda$ is a wavelength for visible light.

14. The apparatus of claim 9 wherein the plurality of substantially-straight metallic lines of predetermined periodicity $\Lambda$ are formed on the thin film substrate by
    forming a layer of sacrificial material on a surface of said substrate;
    buckling said surface of said substrate such that said surface assumes a repetitive undulating topology of periodicity $\Lambda$;
    depositing a masking layer of material at an oblique angle with respect to said buckled first layer so that said material of said masking layer is arranged into regions of alternating thickness of periodicity $\Lambda$; then applying a uniaxial tensile force to said substrate so that said substrate is elongated to a sufficiently stressed length that said material of said masking layer fractures into a plurality of lines of periodicity Λ'; then removing regions of said sacrificial layer that lie between said lines of material of said masking layer; then depositing a metallic layer onto said structure whereby said metallic layer overlies said lines of said masking layer and exposed portions of said substrate; then removing said lines of material of said masking layer, underlying portions of said sacrificial layer and portions of said metallic layer that overlie said lines of material of said masking layer, leaving parallel lines of said metallic layer of periodicity Λ' that directly overlie said substrate; and then removing said uniaxial tensile force from said substrate whereby said substrate is relaxed to substantially said unstressed length the periodicity of said lines of material of said metallic layer is reduced to Λ.

15. The apparatus of claim 14 wherein forming one or more layers of material, creating nanometer-scale periodic surface relief structures and selectively etching said one or more materials includes:

applying a first uniaxial tensile force to stress said substrate whereby said substrate is elongated from said unstressed length to a first stressed length; then forming a layer of sacrificial material on a surface of said substrate; then removing said first uniaxial tensile force from said coated substrate whereby said substrate assumes substantially said unstressed length and said material of said sacrificial layer buckles to assume a repetitive undulating topology of periodicity Λ; then depositing a masking layer of material at an oblique angle with respect to said buckled first layer so that said material of said masking layer is arranged into regions of alternating thickness of periodicity Λ; then applying a second uniaxial tensile force that exceeds said first uniaxial tensile force to said substrate so that said substrate is elongated to a second stressed length exceeding said first stressed length whereby said material of said masking layer is fractured into a plurality of lines of periodicity Λ'; then removing regions of said sacrificial layer that lie between said lines of material of said masking layer; then depositing a metallic layer onto said structure whereby said metallic layer overlies said lines of said masking layer and exposes portions of said sacrificial layer; then removing said lines of material of said masking layer, underlying portions of said sacrificial layer and portions of said metallic layer that overlie said lines of material of said masking layer, leaving parallel lines of said metallic layer of periodicity Λ' that directly overlie said substrate; and then removing said second uniaxial tensile force from said substrate whereby said substrate is relaxed to substantially said unstressed length the periodicity of said lines of material of said metallic layer is reduced to Λ.

16. A direct view display apparatus, comprising:

a source of backlight;

a liquid crystal array;

a wire grid polarizer disposed between the source of backlight and the liquid crystal array, wherein the wire grid polarizer includes a plurality of spaced-apart metal lines on a polymer substrate, wherein the plurality of spaced-apart metal lines is characterized by a periodicity that is less than $\lambda/3$, where $\lambda$ is a wavelength for visible light, wherein no other polarizer is disposed between the wire grid polarizer and the liquid crystal array; and a second polarizer, wherein the liquid crystal array is disposed between the wire grid polarizer and the second polarizer, wherein the second polarizer is configured to transmit light transmitted by the wire grid polarizer.

* * * * *